Dec. 1, 1964  R. F. DAVIS ETAL  3,158,933
TREE PRUNING DEVICE
Filed April 4, 1960  2 Sheets-Sheet 1
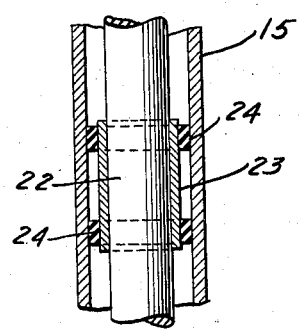
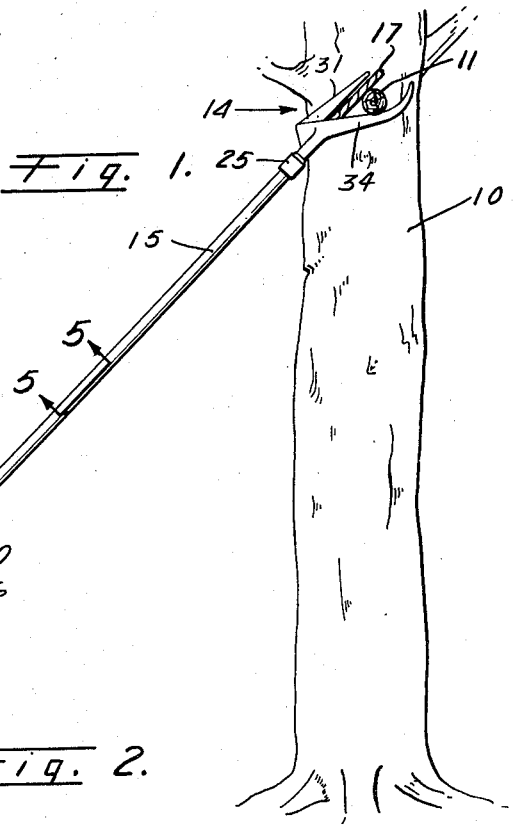
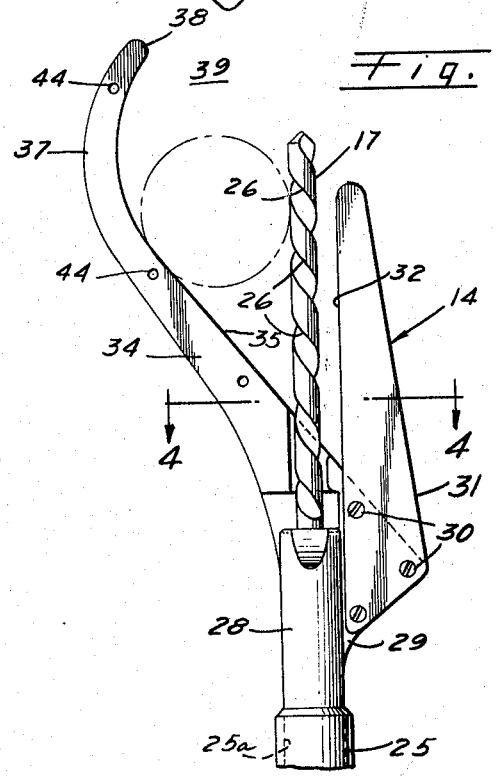
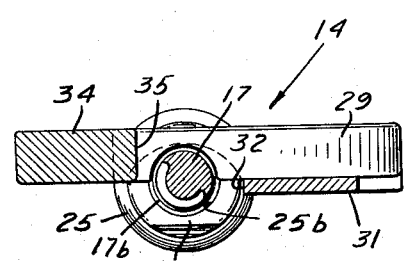
Ray Francis Davis,
Austin Gudmundsen,
INVENTORS.
WHANN & McMANIGAL
Attorneys for Applicants.

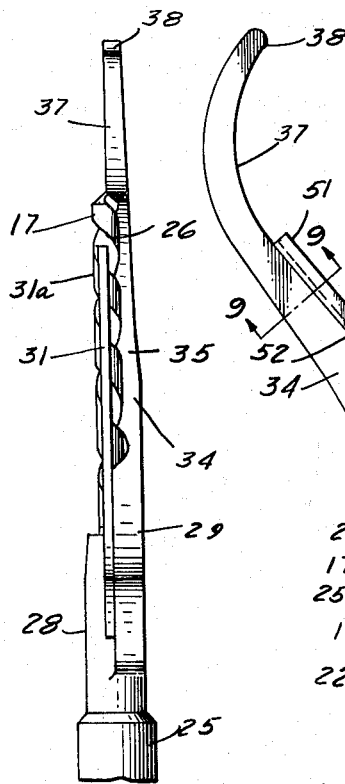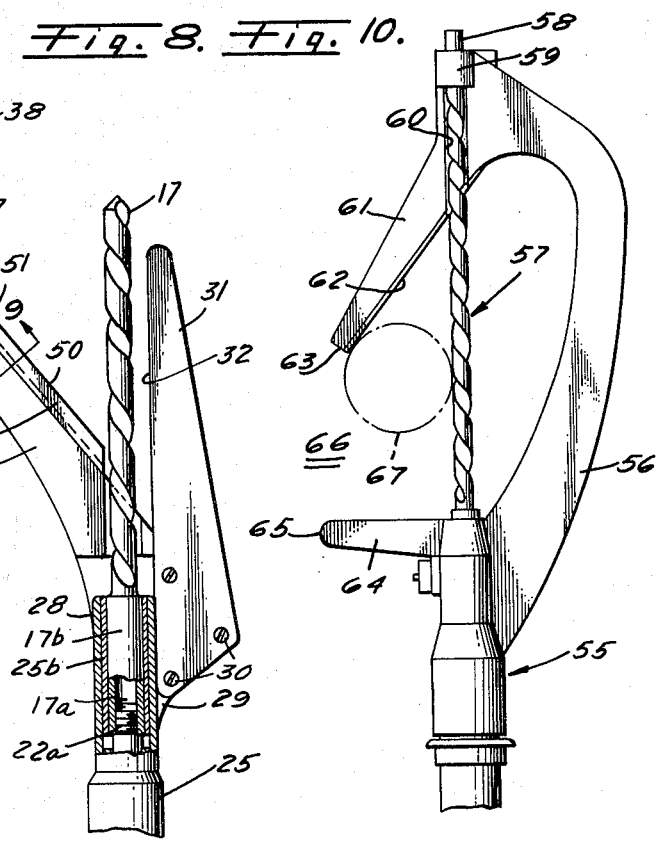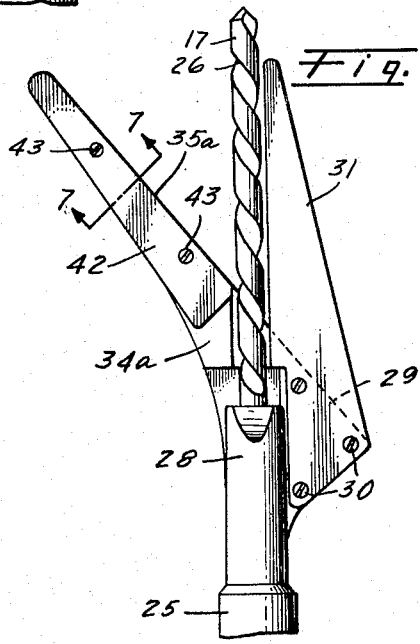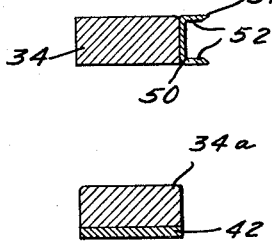

United States Patent Office 3,158,933
Patented Dec. 1, 1964

3,158,933
TREE PRUNING DEVICE
Ray Francis Davis, Los Angeles, and Austin Gudmundsen, Inglewood, Calif., assignors to McCulloch Corporation, Los Angeles, Calif., a corporation of Wisconsin
Filed Apr. 4, 1960, Ser. No. 19,729
8 Claims. (Cl. 30—276)

This invention relates generally to cutting devices and relates more particularly to mechanisms or devices for pruning or trimming trees.

While the invention has particular ultility in connection with the trimming or pruning of trees and is shown and described in such connection, it is to be understood that its utility is not confined thereto.

In trimming or pruning trees experience has shown that when the surface of the area cut is smooth, healing is very rapid, much more rapid than where there is a hairy surface structure. For example, a clean, sharp axe-like cut is far better for healing purposes than a saw cut.

It is therefore an object of the present invention to provide a trimming device or mechanism which will make a smooth cut surface.

Another object of the invention is to provide a device of this character which will provide a cut approaching or equaling the smoothness of an axe cut.

Still another object of the invention is to provide mechanism of this character which will quickly cut relatively large limbs with ease. For example, the cutting of a 4-inch limb with the present device presents no problem.

In tree farming it has been found that when the cut is through the bark of the tree and into or just below the cambium layer of the trunk, within ⅛-inch accuracy, lumber cut from trees thus trimmed is clearer (that is, more free from knots), and hence of a higher grade and quality.

It is therefore a further object of the invention to provide a device or mechanism of this character wherein cutting to the proper depth is easily effected.

A still further object of the invention is to provide a device of this character having means whereby the depth of a cut is readily controlled.

Another object of the invention is to provide a device of this character with which clearing of pest-type undergrowths, especially thorn-like undergrowths, may be easily and quickly effected. In seconds it is possible to reach in and cut a thorny bush with the present mechanism under conditions where it would take many times longer using other types of cutting devices with which we are acquainted.

Still another object of the invention is to provide a device of this character which, when cutting limbs, has a self feeding action in the direction of the tree trunk.

A further object of the invention is to provide a device of this character with which small branches may be cut at locations remote from the stabilizing tree trunk.

A still further object of the invention is to provide a device of this character wherein the cutter element pulls into the wood, so that the operator needs only to lightly push the bit into the wood.

Another object of the invention is to provide a device of this character that is relatively light in weight and hence easy to handle and manipulate.

Still another object of the invention is to provide a device of this character that is relatively simple in construction and operation.

A further object of the invention is to provide a device of this character that is relatively easy, economical and inexpensive to build or manufacture.

A still further object of the invention is to provide a device of this character that is sturdy and rugged.

The characteristics and advantages of the invention are further sufficiently referred to in connection with the following detailed description of the accompanying drawings, which represent certain embodiments. After considering these examples, persons skilled in the art will understand that variations may be made without departing from the principles disclosed, and we contemplate the employment of any structures, arrangements or modes of operation that are properly within the scope of the appended claims.

Referring to the drawings, which are for illustrative purposes only:

FIG. 1 is a side view of a tree trimming or pruning device showing a limb about to be cut from the tree;

FIG. 2 is an enlarged side view of the cutting mechanism;

FIG. 3 is a view taken at right angles to the view shown in FIG. 2 and looking to the left of said FIG. 2;

FIG. 4 is an enlarged sectional view taken on line 4—4 of FIG. 2;

FIG. 5 is an enlarged sectional view taken on line 5—5 of FIG. 1;

FIG. 6 is a side view of an alternative cutter arrangement;

FIG. 7 is an enlarged sectional view taken on line 7—7 of FIG. 6;

FIG. 8 is a side view of the mechanism shown in FIG. 2 but including an attachment for use when cutting limbs at points remote from the tree trunk or large limbs;

FIG. 9 is an enlarged sectional view taken on line 9—9 of FIG. 8; and

FIG. 10 is a side view of another alternative arrangement of the cutting mechanism.

Referring more particularly to FIGS. 1 to 5, there is shown (FIG. 1) a tree trunk having a limb 11 which is to be removed.

The trimming or pruning device or mechanism comprising a cutter head, is indicated generally at 14, at one end of an elongated tubular member 15. At the opposite end of the tubular member 15 there is power means, indicated generally at 16, for actuating the cutter 17 of the head 14. Power means 16 is shown as being an internal combustion engine, although other suitable drive or power means may be used. Engine 16 is of known type and has handles 18 and 19, whereby the mechanism may be held by the operator. At the forward end of the engine there is a socket 20 into which the adjacent end of the tubular member 15 is disposed in the usual manner and secured therein by screws or the like, not shown.

The drive shaft, or crank shaft, of the engine 16, is connected by any suitable well known means, not shown, to a drive shaft 22 which extends longitudinally through the tubular member 15 and is supported in said element by means of bearings of suitable character spaced longitudinally within the tubular member. In FIG. 5 there is shown one of the bearings which comprises a tubular bearing element 23 in which the shaft rotates, said bearing element being supported in the tubular member 15 by means of resilient ring members 24. These resilient ring members serve to damp vibrations of the shaft.

The head 14 includes a tubular support 25 which is attached to the adjacent end of the tubular member 15, said support having a socket part 25a in which the adjacent end portion of member 15 is disposed and to which the socket is secured by any suitable means, such as screws or the like, not shown.

The cutter 17 is a spirally grooved shaft having cutting edges 26 at the forward edges of the grooves. The lower end of the cutter, as shown in the drawings, is provided with a longitudinally extending tapped bore 17a in the base 17b of the cutter 17, the cutter being screwed into the reduced diameter externally threaded end portion 22a of the shaft 22. The threads of these posts are such as to tend to tighten the cutter 17 on the shaft when the mechanism is being operated. The base 17b of the cutter extends into the support 25 and rotates in a bearing 25a in the support 25.

Support 25 has a laterally extending flange 29 to one side of which is secured, by means of screws 30, one end of a gauge 31, which extends alongside of the cutter, the edge 32 of gauge 31 being spaced somewhat from the cutter 17 and extends substantially parallel therewith. The lower end of a gauge and wedge member 34 is secured to the opposite side, or face, of the flange 29 by means of screws or the like, not shown. Gauge 34 includes a part having an edge 35 inclined forwardly and outwardly relative to the axis of the cutter and defining an acute angle therewith. When cutting a limb or the like the inclined edge 35 of the gauge 34 provides a wedging action urging the cutter into and through said limb. The outer end portion 37 of the gauge 34 is arcuate and is curved toward the axis of the cutter. However, the free end 38 of the arcuate portion 37 is spaced a substantial distance from said cutter axis to provide a space 39 for passage of a limb to be cut between said end 38 and the free end of the cutter.

Cutter 17 is rotated in such direction that when cutting the base of a limb where it joins the trunk of the tree, said cutter has a self-feeding action in the direction of the tree trunk. Also, the spirals of the cutter grooves provide a screw action which urges the cutter forwardly into the limb. At the same time edge 35 of the gauge 34 serves as a ram or cam to wedge the limb against the cutter and effect rapid cutting through the limb. Also, the curved part 37 of the gauge 34 is positioned on the adjacent tangent point of the tree trunk when a limb is being cut.

When cutting a limb on the right hand side of the tree trunk, as shown in FIG. 1, for example, the gauge 34 is disposed at the bottom and limb 11 is wedged between the edge 35 of the gauge and the cutter 17. With the head thus positioned the gauge 14 is at the trunk side and is urged against the trunk, the gauge 34 being at the outer side of the head and also rests against the trunk.

It is to be noted that there is an edge portion of the cutter, indicated at 31a in FIG. 3, that will cut into the trunk of the tree, the depth of this cut being determined by the gauges 31 and 34, the part 31a of the cutter extending beyond a plane through the lines of contact of the gauges 31 and 34 with the tree trunk.

Thus the cutter will cut into, or just below, the cambium layer of the trunk.

Limbs also may be cut from the left, or the opposite side of the tree, while the operator is standing in the same position as shown in FIG. 1. In order to cut a limb from the opposite side the tubular member 15 is rotated 180° so that the positions of the gauges 31 and 34 are reversed; that is, gauge 34 is at the top of the limb and gauge 31 is below the limb, both gauges 31 and 34 being in engagement with the tree trunk. The cutter will again pull toward the tree trunk and cut off the limb and into the trunk to the desired depth.

Referring to FIG. 6, there is shown an alternative arrangement wherein the wedging gauge is indicated at 34a and is without the arcuately curved end portion. This arrangement may be used for certain types of cutting or pruning.

Should it be necessary to vary the depth of the cut into the tree trunk, a shim 42 is attached by means of screws 34, to the inner side of the gauge 34a. Thus a shallower cut into the tree trunk will be made. It is to be understood, of course, that the gauge 34 may also be provided with a shim or shims, as desired, there being tapped openings 44 provided for the screws for attaching the shims. In either case one or more shims may be used or shims of different thicknesses may be used.

The cutting depth determined by gauge 31 may also be varied by shims. Means may be provided for attaching a shim to the face of the gauge 31 or a shim or shims may be secured between the flange 29 and the end portion of said gauge 31 attached to said flange.

Referring to FIG. 8, there is shown an arrangement similar to that shown in FIGS. 1-5. There is, however, a channel member 50 secured to the inner edge of the gauge 34 adjacent the cutter. The channel member is secured to the gauge 34 by any suitable means such as screws, not shown, and the free edges 51 of the side flanges 52 are relatively sharp. With this arrangement the device may be used to trim or prune limbs at points remote from the trunk of the tree. The edges 51 of the channel member 50 are, of course, spaced apart and aid in maintaining the device in the proper position. Further, the channel member 50 prevents the device from moving along the branch being cut, an action that would otherwise occur due to the rotation of the cutter.

It is to be understood that for certain types of work the gauge 31 may not be necessary. For example, when there is very thick bark on the tree trunk from which a limb is to be cut, the operator, during the cutting operation, can keep the bit from digging excessively into the tree trunk by gripping the tubular member or pole 15 and holding it against turning or rotating, or said operator may even twist it a desired amount in the direction opposite its normal torque attitude. Thus the operator keeps the gauge 34 against the tree and, using this gauge as a fulcrum, controls the depth of the cut into the trunk.

Also, when the device is used to cut brush the gauge 31 is not necessary in most cases. It may therefore be removed when brush is being cleared.

Referring to FIG. 10 there is shown a cutting head, indicated generally at 55, with a bow-shaped gauge 56 extending forwardly at one side of the cutter, indicated generally at 57. The cutter in this arrangement is provided with a terminal shaft part 58 journaled in a bearing 59 at the outer end of the gauge 56. The gauge 56 also has a groove 60 for partial reception of an outer end portion of the cutter 57. From the outer end of the gauge 56 there is a rearwardly and outwardly inclined gauge 61 having an edge 62 forming an acute angle with the cutter 57, said edge 62 providing a wedging action in a manner similar to the edge 35 but in the opposite direction. The free end 63 of the gauge 61 is spaced from an arm 64 which extends laterally of the support member 55 and oppositely of the gauge 56. Between the free end 63 of the gauge 61 and the free end 65 of the arm 64 there is an opening or space 66 for reception of a limb to be cut. A limb, indicated by the dot-dash lines 67, is received between the edge 62 of the gauge 61 and the cutter 57, and rotation of the cutter tends to provide relative movement between the cutter mechanism and the limb to cause the limb to move into the wedge-shaped space between the gauge 61 and the cutter.

It is to be noted that due to the self-feeding action of the cutter, very little force need be applied by the operator to move the limb along the gauge edges of the gauges so that quick and effective cutting will occur.

It is to be understood, of course, that the gauges 56 and 61 and the arm 64 are used to provide the proper cutting depth of that part of the trunk of the tree from which the limb being cut grows.

The invention and its attendant advantages will be understood from the foregoing description and it will be apparent that various changes may be made in the form, construction and arrangement of the parts of the invention without departing from the spirit and scope thereof or sacrificing its material advantages, the embodiments hereinbefore described being merely for the purposes of illustration.

We claim:

1. A tree trimming device, comprising: an elongated tubular member; power means at one end of said member and connected therewith; a cutter head at the opposite end of said tubular member, said cutter head having a tubular support part secured to the tubular member, a flange extending laterally from said support part, a gauge plate having one end secured to one side of said flange and extending longitudinally forwardly of the support part and having an edge spaced from the axis of said support member, a second gauge plate attached to the opposite side of said flange and extending beyond the opposite side of said axis, said second gauge plate having an inner edge portion forming an acute angle relative to said axis and an end portion curved arcuately toward said axis with the free end thereof spaced substantially from said axis, an elongated spirally grooved cutter having one end extending into said holder member; and means operably connecting together the power means and said cutter, said gauges being adapted for lateral gauging abutment to control the position of the cut relative to the trunk of the tree from which a limb is being cut.

2. A tree trimming device, comprising: an elongated tubular member; cutting mechanism at one end of said tubular member, including a cutting head having a tubular support part secured to the tubular member, a flange extending laterally from said support part; a gauge having one end secured to said flange and extending longitudinally forwardly of the support part, a second gauge attached to said flange and extending across said axis, said second gauge having an inner edge portion forming a wedging ramp and an end portion curved arcuately toward said axis with the free end thereof spaced substantially from said axis, an elongated rotatably mounted spirally grooved cutter extending between at least portions of said gauges; and means for rotating said cutter.

3. In a cutting device: an elongated tubular member; cutting means on one end of said tubular member, said cutting means including a support part, an elongated longitudinally extending, spirally grooved cutter operably supported by said support part, a gauge secured to said support part and extending longitudinally forwardly thereof at one side of said cutter and in spaced relation thereto, a second gauge attached to said support part and extending in a forwardly and diverging direction from the opposite side of said cutter, said second gauge having an outer end portion of greater length than the cutter and curved toward the axis thereof, the free end of said second gauge being spaced from the cutter, said gauges providing means for engaging the adjacent part of a tree from which a branch to be cut extends for controlling the position of the cutter laterally relative to said cutter and tree part, and power means at the opposite end of the tubular member, said power means being operably connected with the cutter for effecting rotation thereof.

4. In a cutting device: a support; an elongated spirally grooved cutter operably supported by said support; a gauge secured to said support and extending longitudinally forwardly thereof at one side of said cutter; and a second gauge attached to said support and extending in a forwardly and diverging direction from the opposite side of said cutter, said second gauge having outer end portion of greater length than the cutter and curved toward the axis thereof, the free end of the second gauge being spaced from the cutter, said gauges providing means for engaging the part of the tree from which a branch being cut extends for positioning the cutter laterally relative to the said part of the tree.

5. In a cutting device: a support; an elongated cutter operably supported by said support; a gauge secured to said support and extending longitudinally forwardly thereof at one side of said cutter; and a second gauge attached to said support and extending in a forwardly and diverging direction from the opposite side of said cutter, said gauges providing means engageable with the adjacent part of a tree from which extends the branch being cut to thereby position said cutter laterally relative to the tree part.

6. The invention defined in claim 5, wherein there is a shim secured to one side of one of the gauges.

7. In a cutting device: a support; an elongated cutter operably supported by said support; gauges secured to said support and extending forwardly therefrom adjacent the cutter, at least one of said gauges being for control of the position of the cutter laterally relative thereto and one of said gauges being at a diverging angle relative to said cutter.

8. In a cutting device: a support; an elongated cutter operably supported by said support; a gauge secured to said support and extending longitudinally forwardly thereof at one side of said cutter; a second gauge attached to said support and extending forwardly and diverging from the opposite side of said cutter; and a gripping and stabilizing member secured to the edge of the diverging gauge adjacent the cutter.

References Cited in the file of this patent

UNITED STATES PATENTS

| | | |
|---|---|---|
| 1,588,744 | Keane | June 15, 1926 |
| 1,591,860 | McGinnis | July 6, 1926 |
| 1,771,764 | Beattie | July 29, 1930 |
| 1,781,564 | Beattie | Nov. 11, 1930 |
| 1,942,766 | O'Banion | Jan. 9, 1934 |
| 2,367,432 | Reprogle | Jan. 16, 1945 |
| 2,645,011 | Otis | July 14, 1953 |
| 2,770,036 | Anderson | Nov. 13, 1956 |
| 2,921,370 | Simpson | Jan. 19, 1960 |